United States Patent
Bilenko et al.

(10) Patent No.: US 10,937,156 B2
(45) Date of Patent: Mar. 2, 2021

(54) SALIENCY MAPPING OF IMAGERY DURING ARTIFICIALLY INTELLIGENT IMAGE CLASSIFICATION

(71) Applicant: Bay Labs, Inc., San Francisco, CA (US)

(72) Inventors: Natalia Bilenko, Oakland, CA (US); Charles Frye, Berkeley, CA (US); Michael G. Cannon, Haverford, PA (US); Nicolas Poilvert, Seattle, WA (US)

(73) Assignee: BAY LABS, INC., San Francisco, CA (US)

(*) Notice: Subject to any disclaimer, the term of this patent is extended or adjusted under 35 U.S.C. 154(b) by 69 days.

(21) Appl. No.: 16/263,836

(22) Filed: Jan. 31, 2019

(65) Prior Publication Data

US 2020/0250813 A1 Aug. 6, 2020

(51) Int. Cl.
*G06T 7/00* (2017.01)
*G06K 9/00* (2006.01)
(Continued)

(52) U.S. Cl.
CPC ........ *G06T 7/0012* (2013.01); *G06K 9/00744* (2013.01); *G06K 9/40* (2013.01); *G06K 9/4671* (2013.01)

(58) Field of Classification Search
CPC .... G06T 7/0012; G06K 9/00744; G06K 9/40; G06K 9/4671; G06K 9/6279; G06N 20/00; G06N 5/022; G06N 5/04
See application file for complete search history.

(56) References Cited

U.S. PATENT DOCUMENTS

2008/0260226 A1* 10/2008 Moriya ................ G06K 9/6201
382/128
2018/0182481 A1* 6/2018 Wakasugi ............ G06K 9/4642
(Continued)

OTHER PUBLICATIONS

M. T Ribeiro. S. Singh, and C. Guestrin. Why should i trust you?: Explaining the predictions of any classifier. In Proceedings of the 22nd ACM SIGKDD International Conference on Knowledge Discovery and Data, pp. 1135-1144 (Year: 2016).*

(Continued)

*Primary Examiner* — Ian L Lemieux
(74) *Attorney, Agent, or Firm* — Steven M. Greenberg Esq.; Shutts & Bowen LLP

(57) ABSTRACT

A saliency mapping method includes displaying video clip imagery of an organ in a display of a computer and submitting the imagery to a neural network trained to produce a probability of an existence of a physical feature of the organ. In response, the probability is received along with a pixel-wise mapping of dispositive pixels in the imagery resulting in the probability. Variations of the imagery are then repeatedly resubmitted to the neural network, each including a change to one or more of the pixels in the imagery. Thereafter, for each resubmission, a change is measured in the probability and then correlated to the changed pixels. Finally, a graphical indicator is overlain on the display of the imagery corresponding to each of the pixels determined through the repeated resubmission to be dispositive based upon a threshold measured change in probability.

18 Claims, 3 Drawing Sheets

(51) Int. Cl.
*G06K 9/40* (2006.01)
*G06K 9/46* (2006.01)

(56) References Cited

U.S. PATENT DOCUMENTS

2020/0054306 A1* 2/2020 Mehanian .............. A61B 8/486
2020/0294241 A1* 9/2020 Wu ..................... G06K 9/6256

OTHER PUBLICATIONS

R. R. Sclvaraju, A. Das, R. Vcdantam, M. Cogswell, D. Parikh. and D. Batra. Grad-cam: Why did you say that? visual explanations from deep networks via gradient-based localization. arXiv preprint arXiv:1610.02391, 2016. 2 (Year: 2016).*
Khean, et al., "The Introspection of Deep Neural Networks Towards Illuminating the Black Box," CAADRIA, Hong Kong, 2018, vol. 2, pp. 237-246.
Zhongzhi, "Mind Computation," World Scientific, p. 364-371, Jan. 1, 2017.
Khan, "A Guide to Convolutional Neural Networks for Computer Vision," Morgan & Claypool, Jan. 1, 2018.
Gao, "Detection and Characterization of the Fetal Heartbeat in Free Hand Ultrasound Sweeps . . . ," MICCAI 2017, Sep. 2017.
Springenberg, "Striving for Simplicity: The All Convolutional Net," ICLR Workshop, Apr. 13, 2015.
Fong, et al., "Interpretable Explanations of Black Boxes by Meaningful Perturbation," Cornell University, Apr. 11, 2017.

* cited by examiner

SALIENCY MAPPING OF IMAGERY DURING ARTIFICIALLY INTELLIGENT IMAGE CLASSIFICATION

BACKGROUND OF THE INVENTION

Field of the Invention

The present invention relates to the field of image feature classification through deep neural networks and more particularly to deep neural network introspection during image classification.

Description of the Related Art

In the context of machine vision, image recognition is the capability of a software to identify people, places, objects, actions and writing in images. To achieve image recognition, a computer processor utilizes machine vision and an image-producing device such as a camera or medical imaging device. Applying a convolutional neural network, the processor takes the subject image and computes the probability by which each image feature contributes to properly classifying the image.

Generally, the complexity and size of the convolutional neural network used to perform image recognition is such that it obfuscates the process that underlies the neural network's particular classification for a subject image. The obscurity of decision making by a neural network has contributed to a degree of mistrust in the use of artificial intelligence in classifying a subject image. In consideration of the recognized potential for mistrust in utilizing artificial intelligence for image classification, some have suggested the use of introspection so as to provide some visibility into the decision making of a deep convolutional neural network.

In this regard, generally, the host platform for a neural network may include a programming interface for introspecting the neural network including retrieving determinative outputs by the different nodes and layers of the neural network in real time. Even still, interpreting the determinative output of a neural network can be difficult, error prone and lacking in definitive guidance as to the precise features of an input image relied upon in producing a resultant classification for the input image. Newer neural network introspective methods have shown promise, but are not sufficient to provide the type of information needed, especially in connection with medical diagnostic imaging such as echocardiography wherein the images contain many fine and esoteric features, often use high frame rate video, are used for extensive measurements and calculations, and often have a lot of noise.

BRIEF SUMMARY OF THE INVENTION

Embodiments of the present invention address deficiencies of the art in respect to neural network introspection and provide a novel and non-obvious method, system and computer program product for saliency mapping. In an embodiment of the invention, a saliency mapping method includes displaying video clip imagery of an organ in a display of a computer, submitting the video clip imagery to a neural network trained to produce a probability of an existence of a physical feature of the organ and receiving in response to the submission, the probability along with a pixel-wise mapping of dispositive pixels in the video clip imagery resulting in the probability.

The method additionally includes repeatedly submitting variations of the video clip imagery to the neural network, with each resubmission including a change to at least one of the pixels in the video clip imagery. Thereafter, in response to each resubmission, a change is measured in the probability and the change is then correlated to the changed pixels. For instance, the measured change in probability may be computed as a combination of an averaging of a gradient of the output after the repeated resubmissions and a measurement of a variance of the gradient of the output after the repeated resubmissions, the repeated submissions beginning with blank video imagery and ending with an approximation of the displayed video clip imagery. Finally, a graphical indicator is overlaid on the display of the video clip imagery corresponding to each of the pixels determined through the repeated resubmission to be dispositive based upon a threshold measured change in probability.

In one aspect of the embodiment, the method includes storing in response to each resubmission, an indication of change for each pixel in a single map corresponding to each frame of the video clip imagery, such that the correlations of the change are indicated by a position of each pixel in the single map. In another aspect of the embodiment, the method additionally includes blurring the single map prior to performing the overlaying. In yet another, the method further includes filtering the single map to remove from the single map, anomalous values. In even yet another aspect of the embodiment, the repeated resubmission includes adding white noise to the video clip imagery to produce noisier version of the video clip imagery. Finally, in even yet another aspect of the embodiment, the method additionally includes storing in connection with different diagnostic, different sets of parameters required for use in the repeated resubmission.

In another embodiment of the invention, an imaging data processing system is configured for saliency mapping. The system includes a host computing system that includes one or more computers, each including memory and at least one processor. The system also includes a diagnostic imaging computer program executing in the memory of the host computing system. The program provides control instructions to a communicatively coupled medical imaging device, and additionally provides an interface to the medical imaging device.

The program yet further includes computer program instructions enabled during execution to display video clip imagery of an organ in a display of the host computing system, submit the video clip of imagery to a neural network disposed within the memory of the host computing system and trained to produce a probability of an existence of a physical feature of the organ and receive in response to the submission, the probability along with a pixel-wise mapping of dispositive pixels in the video clip imagery resulting in the probability. The computer program instructions are further enabled to perform the repeated resubmission of variations of the video clip imagery to the neural network, with each resubmission including a change to at least one of the pixels in the video clip imagery. As such, in response to each resubmission, a change is measured in the probability and the change correlated to the changed pixels. Finally, a graphical indicator is overlaid on the display of the video clip imagery corresponding to each of the pixels determined through the repeated resubmission to be dispositive based upon a threshold measured change in probability.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for saliency mapping. In accordance with an embodiment of the invention, video clip imagery is received for an organ, and a physical feature of the organ is identified through the utilization of a deep neural network trained to identify the physical feature and to produce a corresponding probability of the identification of the physical feature. In particular, the deep neural network, in addition to producing the identification, also returns a pixel-wise mapping of dispositive pixels in the video clip imagery resulting in the probability. Thereafter, a variation of the video clip imagery in terms of a change in one or more pixels of the video clip imagery is presented to the neural network and a resulting gradient of the output measured with respect to the changed pixels. The process repeats, with each repetition including different changes to the pixels in the video clip imagery. Optionally, an average of the resulting gradient of the output may be measured across multiple resubmissions of variations of the video clip imagery ranging from a blank image to a near approximation of the original image. As well, the averaged gradient may be combined with a measurement of a variance of the gradient to produce a composite value. The composite value is then correlated to one or more of the changed pixels. Thereafter, a graphical indicator may be overlaid onto the display of the video clip imagery corresponding to each of the pixels determined through the repeated resubmission to be dispositive based upon a measured change in gradient or composite value beyond a threshold value.

Figure 1:
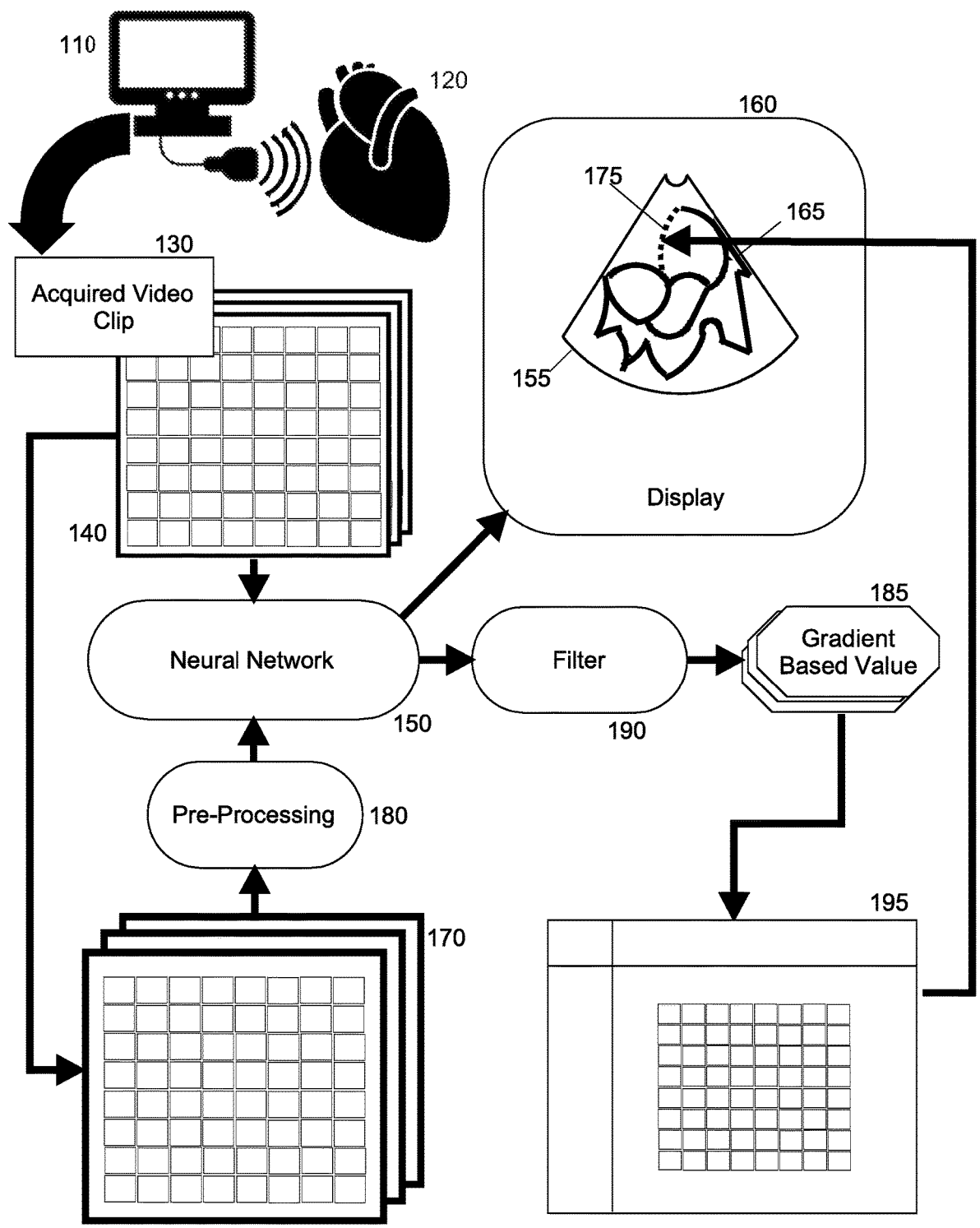
FIG. 1 is a pictorial illustration of a process for saliency mapping for interpreting confidence in artificially intelligent image processing.

In further illustration, FIG. 1 is a pictorial illustration of a process for saliency mapping for interpreting confidence in artificially intelligent image processing. As shown in FIG. 1, an ultrasound imaging apparatus 110 acquires video clip imagery 130 of a target organ 120. The video clip imagery 130 includes different images 140 arranged as a sequence of frames with each of the images 140 having a grid of pixels.

Each of the different images 140 of the video clip imagery 130 is then processed as input to a neural network 150 trained to characterize one or more features present in the video clip imagery 130 in respect to the target organ 120. Thereafter, the video clip imagery 130 is presented as an ultrasound image 155 of the physical structure 165 of the target organ 120 in a display 160 of the ultrasound imaging apparatus 110. Also presented in the display 160 is the characterization of the one or more features present in the video clip imagery 130 produced by the neural network 150.

Notably, introspection of the neural network 150 may be performed in the ultrasound imaging apparatus 110. In this regard, for each one of the images 140 of the video clip imagery 130, a sequence of variations 170 is applied to the corresponding one of the images 140. Each of the variations 170 represents the corresponding one of the images 140 with information for one or more of the pixels perturbed so as to represent the corresponding one of the images 140 in a range from a blank image to a near approximation of the corresponding one of the images 140. Each of the variations 170 is then pre-processed 180, for instance by adding white noise to the variations 170. Then, each variation is submitted to the neural network 150 and a gradient is measured in the output of the neural network 150 in consequence of the submission to the neural network 150 of the variation 170. Gradient-based values 185 may be further subject to statistical processing, e.g. averaging or computation of variance.

Optionally, the gradient may be subjected to filtering 190 so as to remove anomalous values, and to perform data smoothing. The resultant values are gradient based values 185 which may then be stored in an image grid 195 in each position corresponding to a pixel in the variation 170 that had been removed from the corresponding one of the images. Once the image grid 195 has been completed, gradient based values 185 falling below a threshold are removed while gradient based values 185 exceeding a threshold are transformed into a pixel value for rendering in the display 160. Specifically, the resultant image grid 195 is overlain over the ultrasound imagery 155 of the physical structure 165 so as to provide for a visual emphasis 175 of the portions of the physical structure 165 most affected by the variation 170 and thus considered most dispositive to the neural network 150 in computing the characterization of the ultrasound imagery 155.

Figure 2:
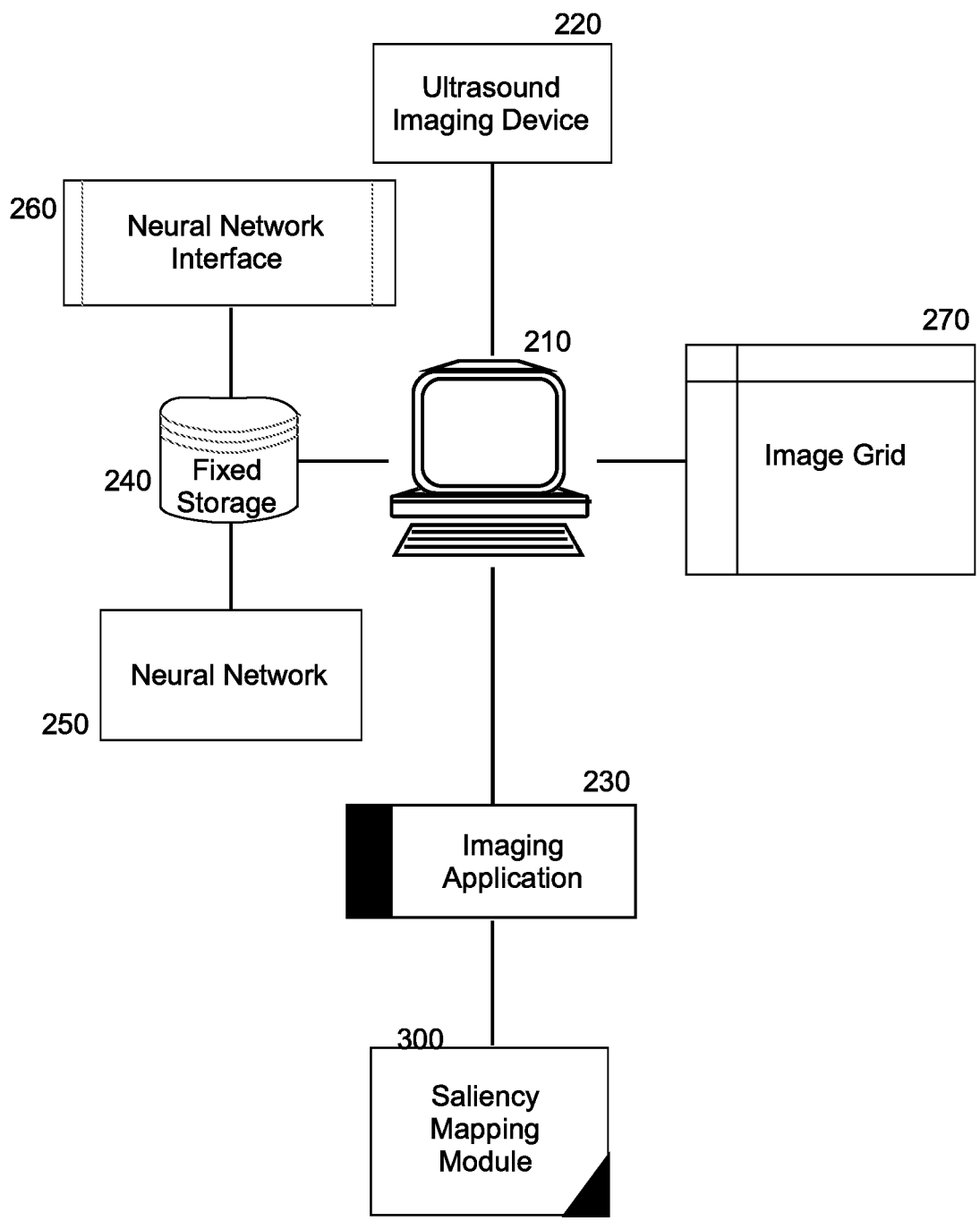
FIG. 2 is a schematic illustration of an imaging data processing system configured for saliency mapping for interpreting confidence in artificially intelligent image processing; and, FIG. 3 is a flow chart illustrating a process for saliency mapping for interpreting confidence in artificially intelligent image processing.

The process described in connection with FIG. 1 may be implemented in an imaging data processing system. In further illustration, FIG. 2 schematically shows an imaging data processing system configured for saliency mapping for interpreting confidence in artificially intelligent image processing. The system includes a host computing system 210 that includes a computer with at least one processor, memory and a display. The host computing system 210 is coupled to an ultrasound imaging device 220 adapted to acquire ultrasound imagery through the placement of an imaging wand (not shown) proximate to a target organ of interest in a mammalian subject.

Importantly, the host computing system 210 is communicatively coupled to fixed storage 240, either locally or remotely ("in the cloud") storing therein a neural network 250 and a programmatic interface 260 to the neural network 250. The neural network 250 is trained to characterize one or more features of the target organ, for example an ejection fraction value of a heart, or the presence or absence of aortic stenosis. To do so, video clip imagery from the ultrasound imaging device is provided to the neural network 250 using an imaging application 230 which in turn accesses the programmatic interface 260 so that the neural network 250 may then output the characterization for the video clip imagery along with an indication of confidence in that characterization. The imaging application 230 in turn renders on the display of the host computing system 210 not only the video clip imagery, but also the characterization and optionally, the indication of confidence.

In accordance with an embodiment of the invention, a saliency mapping module 300 is included with the imaging application 230. The saliency mapping module 300 include computer program instructions that when executing in the memory of the host computing system 210, are enabled to generate for each image of the video clip imagery, a sequence of different variations by modifying one or more pixels from each image. The resulting set of images range from a blank image to a near approximation of the original image. The program instructions are further enabled to submit each image in the set, in sequence to the neural network 250 using the programmatic interface 260, and to read a gradient of the output from the neural network 250. The program instructions optionally, are enabled to compute an average over time of the measured gradients, and also a variance over time of the measured gradients, and to combine the average and variance computationally to produce a gradient based value within a range of a pixel value of an image.

The program instructions then are enabled to store the gradient based values in an image grid 270 at a position corresponding to the pixels that had been removed in the images of the set. The program instructions are even further enabled to filter the values in the image grid 270, for instance by applying a band pass filter intended to remove outlying values which are either too small or too high. The program instructions are even yet further enabled to applying a blurring function to the image grid 270, such as a Gaussian low pass filter. Finally, the program instructions are enabled to direct the imaging application 230 to overlay a presentation of the image grid 295 upon the display of the video clip imagery from the ultrasound imaging device 220. The resulting appearance of the video clip imagery in the display of the host computing system 210 will demonstrate the most salient pixels on the video clip imagery considered by the neural network 250 in producing the characterization of the video clip imagery.

Figure 3:
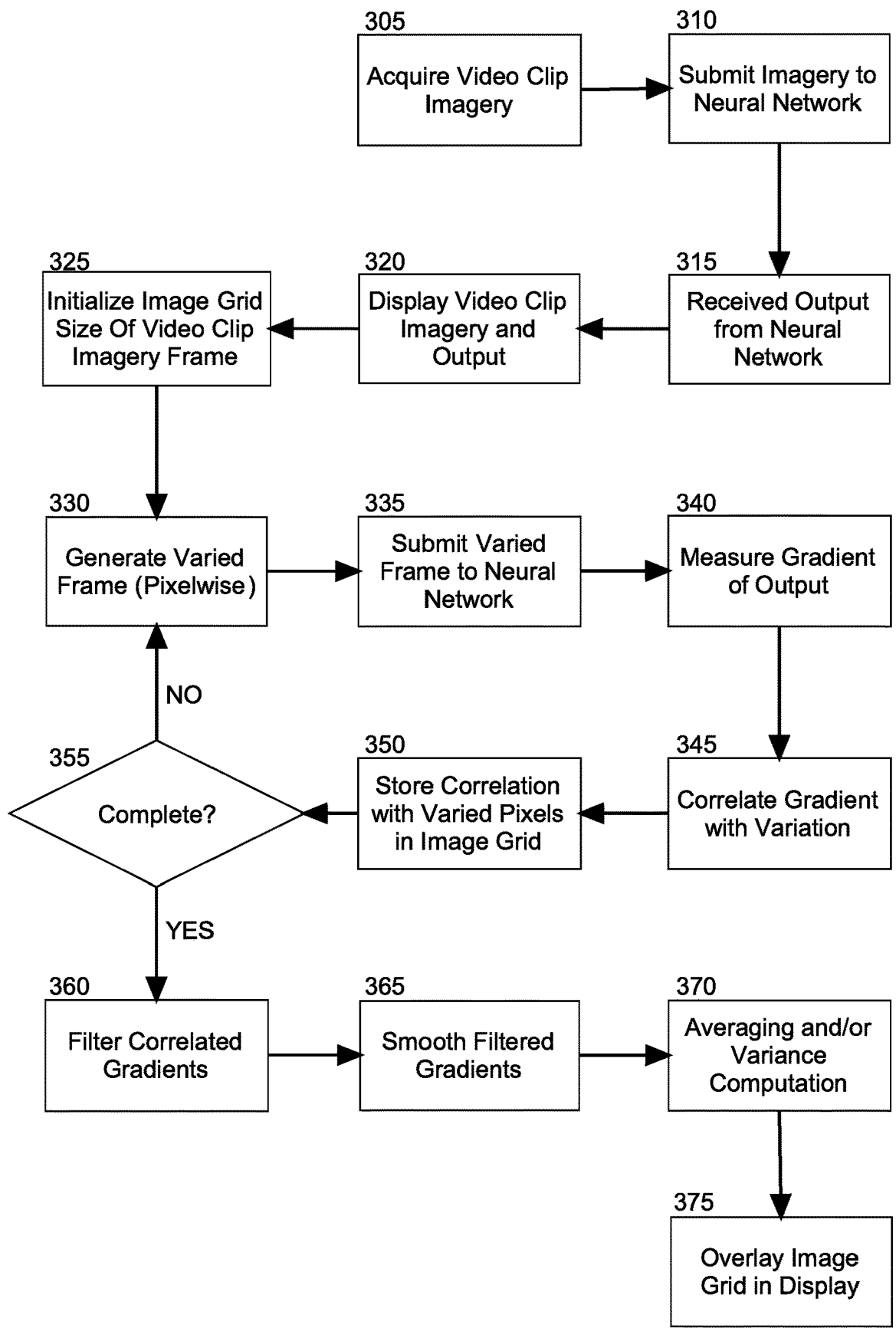

In even yet further illustration of the operation of the saliency mapping module, FIG. 3 is a flow chart illustrating a process for saliency mapping for interpreting confidence in artificially intelligent image processing. Beginning in block 305, video clip imagery is acquired from an ultrasound imaging device of a target organ and in block 310, the video clip imagery is submitted to a neural network training to perform image-based characterization of the target organ. In block 315, an output characterization of the video clip imagery is received from the neural network and in block 320, the video clip imagery along with the output characterization is displayed in a display of the host computing system.

In block 325, an image grid is then initialized to have the same dimensionality as each image of the video clip imagery. In block 330, a first pixel varied image is generated by perturbing at least one pixel from the corresponding image of the video clip imagery. Then, in block 335, the varied image is supplied to the neural network and in block 340, a gradient is received from the neural network in reference to the output characterization of the varied image as compared to the previously submitted image of the video clip imagery. In block 345, the gradient is correlated to the variant pixels removed in the varied image and in block 350, the correlation is transformed into a pixel value and stored in the image grid at one or more positions each corresponding to the variant pixels. In decision block 355, if additional varied images remain to be generated and processed, the method returns to block 330 with the creation of a new varied image with additional pixels removed from the image of the video clip imagery.

In decision block 355, when no more varied images remain to be generated and processed in the neural network, in block 360, the image grid is filtered to remove anomalous values and in block 365, the values of the image grid are smoothed. Then, in block 370, the values are subjected to statistical processing, for instance averaging or variance computation. Finally, in block 375 the image grid is overlain in the display of the host computing system with the rendering of the video clip imagery so as to visually emphasize those pixels of the video clip imagery most salient from the perspective of the neural network in producing the characterization of the video clip imagery.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the user's computer, as a stand-alone software package, partly on the user's computer and partly on a remote computer or entirely on the remote computer or server. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A saliency mapping method comprising:
    displaying video clip imagery of an organ in a display of a computer;
    submitting the video clip of imagery to a neural network trained to produce one or more outputs associated with a probability of an existence of a physical feature of the organ;
    receiving in response to the submission, the probability along with a pixel-wise mapping of dispositive pixels in the video clip imagery resulting in the probability;
    repeatedly resubmitting variations of the video clip imagery to the neural network, each resubmission including a change to one of the pixels in the video clip imagery;
    in response to each resubmission, measuring a change in the probability and correlating the change to the changed one of the pixels;
    overlaying a graphical indicator on the display of the video clip imagery corresponding to each of the pixels determined through the repeated resubmission to be dispositive based upon a threshold measured change in probability; and,
    storing in connection with different diagnostic conditions, different sets of parameters required for use in the repeated resubmission, where the different sets of parameters are associated with different diagnostic conditions and the overlaying of the graphical indicator on the display of the video clip imagery is associated with one or more of the different diagnostic conditions.

2. The method of claim 1, further comprising computing the measured change in probability as a combination of an averaging of a gradient of the output after the repeated resubmissions and a measurement of a variance of the gradient of the output after the repeated resubmissions, the repeated submissions beginning with blank video imagery and ending with an approximation of the displayed video clip imagery.

3. The method of claim 1, further comprising storing in response to each resubmission, an indication of change for each pixel in a single map corresponding to each frame of the video clip imagery, the correlations of the change being indicated by a position of each pixel in the single map.

4. The method of claim 3, further comprising blurring the single map prior to performing the overlaying.

5. The method of claim 4, further comprising filtering the single map to remove from the single map, anomalous values.

6. The method of claim 1, wherein the repeated resubmission comprises adding white noise to the video clip imagery to produce a noisier version of the video clip imagery.

7. An imaging data processing system configured for saliency mapping, the system comprising:
    a host computing system comprising one or more computers, each including memory and at least one processor;
    a diagnostic imaging computer program executing in the memory of the host computing system, the program providing control instructions to a communicatively coupled medical imaging device, the program additionally providing an interface to the medical imaging device, the program yet further comprising computer program instructions enabled during execution to perform:
        displaying video clip imagery of an organ in a display of the host computing system;
        submitting the video clip of imagery to a neural network disposed within the memory of the host computing system and trained to produce an output associated with a probability of an existence of a physical feature of the organ;

receiving in response to the submission, the probability along with a pixel-wise mapping of dispositive pixels in the video clip imagery resulting in the probability;

repeatedly resubmitting variations of the video clip imagery to the neural network, each resubmission including a change to one of the pixels in the video clip imagery;

in response to each resubmission, measuring a change in the probability and correlating the change to the changed one of the pixels;

overlaying a graphical indicator on the display of the video clip imagery corresponding to each of the pixels determined through the repeated resubmission to be dispositive based upon a threshold measured change in probability; and, storing in connection with different diagnostic conditions, different sets of parameters required for use in the repeated resubmission, where the different sets of parameters are associated with different diagnostic conditions and the overlaying of the graphical indicator on the display of the video clip imagery is associated with one or more of the different diagnostic conditions.

8. The system of claim 7, wherein the computer program instructions are further enabled to perform computing the measured change in probability as a combination of an averaging of a gradient of the output after the repeated resubmissions and a measurement of a variance of the gradient of the output after the repeated resubmissions, the repeated submissions beginning with blank video imagery and ending with an approximation of the displayed video clip imagery.

9. The system of claim 7, wherein the computer program instructions are further enabled to perform storing in response to each resubmission, an indication of change for each pixel in a single map corresponding to each frame of the video clip imagery, the correlations of the change being indicated by a position of each pixel in the single map.

10. The system of claim 9, wherein the computer program instructions are further enabled to perform blurring the single map prior to performing the overlaying.

11. The system of claim 10, wherein the computer program instructions are further enabled to perform filtering the single map to remove from the single map, anomalous values.

12. The system of claim 7, wherein the repeated resubmission comprises adding white noise to the video clip imagery to produce noisier version of the video clip imagery.

13. A computer program product for saliency mapping method, the computer program product including a non-transitory computer readable storage medium having program instructions embodied therewith, the program instructions executable by a device to cause the device to perform a method including:

displaying video clip imagery of an organ in a display of a computer;

submitting the video clip of imagery to a neural network trained to produce an output associated with a probability of an existence of a physical feature of the organ;

receiving in response to the submission, the probability along with a pixel-wise mapping of dispositive pixels in the video clip imagery resulting in the probability;

repeatedly resubmitting variations of the video clip imagery to the neural network, each resubmission including a change to one of the pixels in the video clip imagery;

in response to each resubmission, measuring a change in the probability and correlating the change to the changed one of the pixels;

overlaying a graphical indicator on the display of the video clip imagery corresponding to each of the pixels determined through the repeated resubmission to be dispositive based upon a threshold measured change in probability; and, storing in connection with different diagnostic conditions, different sets of parameters required for use in the repeated resubmission, where the different sets of parameters are associated with different diagnostic conditions and the overlaying of the graphical indicator on the display of the video clip imagery is associated with one or more of the different diagnostic conditions.

14. The computer program product of claim 13, wherein the method further comprises computing the measured change in probability as a combination of an averaging of a gradient of the output after the repeated resubmissions and a measurement of a variance of the gradient of the output after the repeated resubmissions, the repeated submissions beginning with blank video imagery and ending with an approximation of the displayed video clip imagery.

15. The computer program product of claim 13, wherein the method further comprises storing in response to each resubmission, an indication of change for each pixel in a single map corresponding to each frame of the video clip imagery, the correlations of the change being indicated by a position of each pixel in the single map.

16. The computer program product of claim 15, wherein the method further comprises blurring the single map prior to performing the overlaying.

17. The computer program product of claim 16, wherein the method further comprises filtering the single map to remove from the single map, anomalous values.

18. The computer program product of claim 13, wherein the repeated resubmission comprises adding white noise to the video clip imagery to produce noisier version of the video clip imagery.

* * * * *